US011331772B2

(12) United States Patent
Herzinger et al.

(10) Patent No.: US 11,331,772 B2
(45) Date of Patent: May 17, 2022

(54) METHOD OF CONNECTING TWO COMPONENTS AS WELL AS A COMPONENT CONNECTION

(71) Applicant: Bayerische Motoren Werke Aktiengesellschaft, Munich (DE)

(72) Inventors: Thomas Herzinger, Munich (DE); Sonja Wolf, Munich (DE); Johann van Niekerk, Munich (DE); Matthias Berger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 24 days.

(21) Appl. No.: 14/169,897

(22) Filed: Jan. 31, 2014

(65) Prior Publication Data

US 2014/0143989 A1 May 29, 2014

Related U.S. Application Data

(63) Continuation of application No. PCT/EP2012/063535, filed on Jul. 11, 2012.

(30) Foreign Application Priority Data

Aug. 3, 2011 (DE) ...................... 10 2011 080 317.3

(51) Int. Cl.
*B25B 5/00* (2006.01)
*B23K 31/02* (2006.01)
(Continued)

(52) U.S. Cl.
CPC ................ *B25B 5/00* (2013.01); *B23K 31/02* (2013.01); *C09J 5/00* (2013.01); *F16B 5/065* (2013.01);
(Continued)

(58) Field of Classification Search
CPC .. B25B 5/00; F16B 5/06; F16B 5/0621; F16B 5/0642; F16B 5/065; F16B 21/06;
(Continued)

(56) References Cited

U.S. PATENT DOCUMENTS 1,484,214 A * 2/1924 Gates ...................... F16B 21/06
24/656
2,266,049 A 12/1941 Kost
(Continued)

FOREIGN PATENT DOCUMENTS

CN   1246095 A    3/2000
CN  102330727 A   1/2012
(Continued)

OTHER PUBLICATIONS

Chinese Office Action dated Apr. 3, 2015 with English translation (seven pages).
(Continued)

*Primary Examiner* — Christopher M Koehler
(74) *Attorney, Agent, or Firm* — Crowell & Moring LLP

(57) ABSTRACT

A method of connecting a first component having a first hole with a second component having a second hole includes the acts of placing together the two components so that the holes are situated above one another, and fixing the two components on one another. The fixing occurs by pushing a connection element projecting beyond the two components through the two components, the connection element having at least one clamping head which projects beyond a side of the first component facing away from the second component, and clipping a clamping element onto the clamping head, so that the clamping element is supported on a side of the first component facing away from the second component and exercises a clamping force onto the connection element which clamps together the two components.

12 Claims, 1 Drawing Sheet

(51) Int. Cl.
*C09J 5/00* (2006.01)
*F16B 5/06* (2006.01)
*F16B 5/08* (2006.01)
*F16B 21/08* (2006.01)

(52) U.S. Cl.
CPC .............. *F16B 5/0664* (2013.01); *F16B 5/08* (2013.01); *F16B 21/082* (2013.01); *C09J 2400/163* (2013.01); *Y10T 24/44* (2015.01); *Y10T 29/49876* (2015.01); *Y10T 403/70* (2015.01)

(58) Field of Classification Search
CPC .. F16B 21/082; F16B 2/02; F16B 2/16; F16B 2/20; F16B 2/24
See application file for complete search history.

(56) References Cited

U.S. PATENT DOCUMENTS

| | | | |
|---|---|---|---|
| 2,895,367 A | | 7/1959 | Nagy |
| 3,009,381 A | * | 11/1961 | Rapata ...................... F16B 5/06 24/114.4 |
| 3,357,292 A | * | 12/1967 | Falkenberg ............. F16B 21/06 411/352 |
| 3,683,737 A | | 8/1972 | Oetiker |
| 3,724,150 A | * | 4/1973 | Hudnall .................. E04F 19/08 174/486 |
| 3,747,261 A | * | 7/1973 | Salem .................. A63H 33/108 446/104 |
| 3,822,499 A | * | 7/1974 | De Vos ................ A63H 33/108 446/121 |
| 3,881,288 A | * | 5/1975 | Fay ....................... F16B 5/0642 29/452 |
| 4,318,208 A | * | 3/1982 | Borja .................... E05C 19/066 24/305 |
| 4,668,145 A | * | 5/1987 | Hirohata ................. F16B 5/065 411/45 |
| 5,014,934 A | * | 5/1991 | McClaflin .................. B64C 1/12 244/129.4 |
| 5,473,955 A | * | 12/1995 | Stinson ..................... B60S 1/24 15/250.27 |
| 5,562,375 A | * | 10/1996 | Jackson .............. F16B 19/1081 411/48 |
| 5,580,204 A | * | 12/1996 | Hultman ................. F16B 5/065 24/297 |
| 5,771,650 A | * | 6/1998 | Williams .................. E04B 2/08 24/DIG. 41 |
| 5,775,863 A | * | 7/1998 | Anderson ............... F16B 21/16 24/108 |
| 6,042,296 A | * | 3/2000 | Wittig .................. F16B 5/0642 24/297 |
| 6,209,175 B1 | * | 4/2001 | Gershenson ............ F16B 5/065 24/297 |
| 6,253,423 B1 | | 7/2001 | Friedrich et al. |
| 6,442,806 B1 | * | 9/2002 | Wesson ..................... F16B 2/06 24/16 PB |
| 2004/0148760 A1 | * | 8/2004 | Wang .................. B23K 11/0066 29/525.06 |
| 2005/0191119 A1 | * | 9/2005 | Aoshima ............... F16B 21/082 403/122 |
| 2008/0261484 A1 | * | 10/2008 | Culpepper ............... A63H 3/16 446/373 |
| 2009/0309388 A1 | * | 12/2009 | Ellison .................... B60R 13/04 296/191 |
| 2011/0191990 A1 | * | 8/2011 | Beaulieu ............... F16B 21/073 24/457 |
| 2011/0239566 A1 | * | 10/2011 | Ciuperca .................. B23P 11/00 52/259 |

FOREIGN PATENT DOCUMENTS

| | | |
|---|---|---|
| DE | 14 75 035 A1 | 4/1969 |
| DE | 20 53 444 A1 | 5/1971 |
| DE | 100 01 444 A1 | 7/2001 |
| DE | 10 2010 028 323 A1 | 11/2011 |
| GB | 1 288 840 A | 9/1972 |
| WO | WO 2005/068290 A1 | 7/2005 |

OTHER PUBLICATIONS

English translation of Chinese Office Action dated Sep. 2, 2014 (ten (10) pages).

International Search Report dated Sep. 14, 2012 with English translation (eight (8) pages).

Chinese Office Action dated Aug. 6, 2015 with English translation (eight pages).

* cited by examiner

METHOD OF CONNECTING TWO COMPONENTS AS WELL AS A COMPONENT CONNECTION

CROSS REFERENCE TO RELATED APPLICATIONS

This application is a continuation of PCT International Application No. PCT/EP2012/063535, filed Jul. 11, 2012, which claims priority under 35 U.S.C. § 119 from German Patent Application No. 10 2011 080 317.3, filed Aug. 3, 2011, the entire disclosures of which are herein expressly incorporated by reference.

This application contains subject matter related to U.S. application Ser. No. 14/169,852, entitled "Connecting Element," filed on Jan. 31, 2014.

BACKGROUND AND SUMMARY OF THE INVENTION

The present invention relates to a method of connecting two components as well as to a component connection.

In the large-scale production of vehicle bodies, a plurality of vehicle parts have to be positioned relative to one another with high precision and repetitive accuracy, for example, by welding, bolting, gluing, or the like. So far, the aligning of the components to be mutually connected has predominantly been taking place by component-specific and correspondingly expensive positioning devices. The vehicle body parts to be positioned relative to one another are usually positioned at the positioning devices by use of alignment pins. Such positioning devices are not only expensive but also inflexible because they have to be specifically coordinated with the respective vehicle body component.

It is an object of the invention to create a cost-effective and flexible method of connecting two components as well as a corresponding component connection.

This and other objects are achieved by the method of connecting a first component having a first hole with a second component having a second hole, as well as a component connection formed therefrom. The method includes putting together the two components so that the holes are situated above one another, fixing the two components on one another by pushing a connection element projecting beyond the two components through the two components, the connection element having at least one clamping head which projects beyond a side of the first component facing away from the second component, and clipping a clamping element onto the clamping head, so that the clamping element is supported on a side of the first component facing away from the second component and exercises a clamping force onto the connection element which clamps together the two components.

The basic principle of the invention consists of a connection element which has at least one clamping head onto which a clamping element is clipped. By means of such a connection element, two components can also be mutually connected or can also only be detachably fixed relative to one another. Although the invention will be described in the following by way of two components to be mutually connected, it is understood that naturally also three or more components can be fixed above one another or adjoining one another by way of a fixing device according to the invention.

The term "component" should be interpreted extremely broadly. In principle, it may apply to any components. Since the invention can particularly also be used in vehicle body construction, one of the two components or both components may be vehicle body components.

The first component has a first hole and the second component has a second hole. The components to be mutually connected are first placed on one another such that the holes are situated above one another. The term "placed" does not define a certain position or direction in space but should be interpreted very generally, specifically in the sense of "putting together".

Subsequently, the two components are mutually (detachably) connected or (detachably) prefixed relative to one another by way of the connection element and the at least one clamping element. For this purpose, the connection element is fitted through the holes provided in the two components such that the at least one clamping head of the connection element projects beyond a side of the one component which faces away from the other component.

Subsequently, a clamping element is clipped onto the clamping head of the connection element, in which case the connection element and the clamping element are conceived and coordinated with one another such that the clamping element is support on one of the two components and exercises a clamping force upon the connection element which clamps the two components together. The connection element therefore operates as a "dowel pin" which is guided through the holes provided in the two components. The clamping element or the clamping elements tension the two components with respect to one another.

The two components can be (detachably) connected with one another or can be prefixed relative to one another by one or more such "prefixing devices", which are each formed by a connection element having at least one clamping head and at least one clamping element.

After the mounting of such a fixing device or several such fixing devices, the two components can be permanently fixedly connected with one another, for example, by welding, gluing, screwing, riveting or by other connection techniques, particularly by those connection techniques, which cannot easily be detached, i.e. not without the aid of tools. The permanent fixed connecting of the two components differs from the (detachable) fixing or connecting of the two components by means of the connection element in that the fixing device formed by the connection element and the at least one clamping element can easily be detached manually by pulling the clamping element off the clamping head of the connection element.

Correspondingly, it may be provided that, after the permanent connecting of the two components, the at least one clamping element and the connection element can be removed again from the two components.

It may be provided that a fixing device formed by the connection element and at least one clamping element is used exclusively for the fixing or positioning of two components to be mutually connected.

According to a further development of the invention, the holes provided in the two components, through which holes the connection element is fitted, have a circular design. It may, in particular, be provided that the two components are aligned such that the holes are arranged concentrically relative to one another.

As an alternative, it may also be provided that one of the two holes, or both holes, have a shape that differs from a circular shape. For example, one of the two holes or both holes may be designed as oblong holes, which will then permit a "floating fixation" of the two components relative to one another.

The two components may be mutually connected by several "component connections" according to the invention, which are each formed by at least one connection element and at least one clamping element, respectively. When all "fixing points" have a floating design, the two components can still be displaced relative to one another after the prefixing, i.e. they can be moved to a predefined relative position. The geometry and alignment of the holes, which may, for example, be designed as oblong holes, in this case, define the degrees of freedom at which the two components can "float" relative to one another.

It may further be provided that the connection element and/or one of the two holes or both holes have a rotationally symmetrical design with respect to a longitudinal axis. In this case, the two components can also be rotated relative to one another about the longitudinal axis after the insertion of the connection element.

As an alternative, it may also be provided that the connection element and one of the two holes or both holes specifically have no rotationally symmetrical design but have a contour deviating therefrom, such as a polygonal contour. In this case, the two components can not only be clamped together by use of a single connection element but can additionally also be positioned relative to one another in a manner protected against rotation about the longitudinal axis.

According to a further development of the invention, the connection element has a "fitting section," which has a design that is complementary with respect to the two holes. The fitting section is that section of the connection element which penetrates the two components. The fitting section therefore forms a "fit" with at least one of the two holes. The term "fitting" is a term used in general mechanical engineering that is familiar to a person skilled in the art and therefore does not have to be explained in detail.

It may be provided that the fitting section corresponds to the thickness of the two components to be connected relative to one another. By means of such a fitting section, it can be achieved that the two components are undisplaceably positioned relative to one another in a direction transversely to the longitudinal axis of the connection element. The term "fitting section" means that the corresponding section of the connection element, with respect to the two holes, has only very little air or only a very slight play of, for example, a few tenths of a millimeter, a few hundredths of a millimeter, a few thousandths of a millimeter or even less.

The clamping head of the connection element is preferably designed as a sphere. As an alternative, it may have a shape similar to a sphere, for example, the shape of a spherical cap, of a cut-off sphere or of a cut-off spherical cap, or the like. The clamping head may be an integral component of the connection element. It may also be connected in one piece with the fitting section.

As mentioned above, a connection element according to the invention has at least one clamping head. In addition to the "first clamping head", the connection element may also have a second clamping head which faces away from the first clamping head. The second clamping head can therefore be connected with the first clamping head by way of the fitting section.

A clamping element may also be clipped onto the second clamping head. Such a "fixing device" consists essentially of two clamping elements which are each clipped onto an assigned clamping head of a connection element which extends through two components which are to be mutually connected with one another.

The connection element may be made of metal, particularly of steel or aluminum. In principle, the connection element and the at least one clamping element or the clamping elements may also be produced of a different material, such as a synthetic material.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
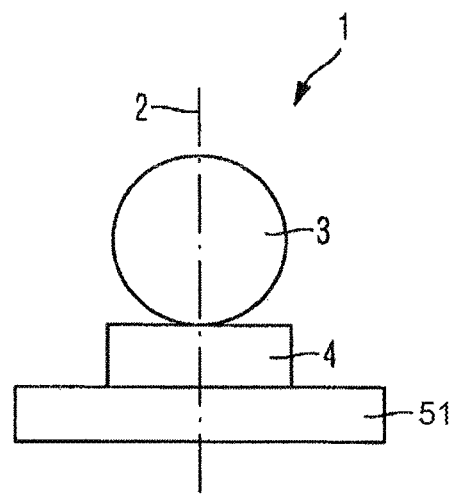
FIG. 1 is a view of a first embodiment of a connection element according to the invention.

FIG. 1 illustrates a connection element 1, which has a rotationally symmetrical construction with respect to a longitudinal axis 2. The connection element 1 has a clamping head 3 which is further developed here as a sphere. A fitting section 4 adjoins the clamping head 3. The fitting section 4 is coordinated in a complementary manner with respect to two holes which are provided in components to be connected with one another. A clamping section 51 adjoins the fitting section 4, which clamping section 51 covers or reaches behind one of the two holes provided in components (not shown) to be connected with one another.

Figure 2:
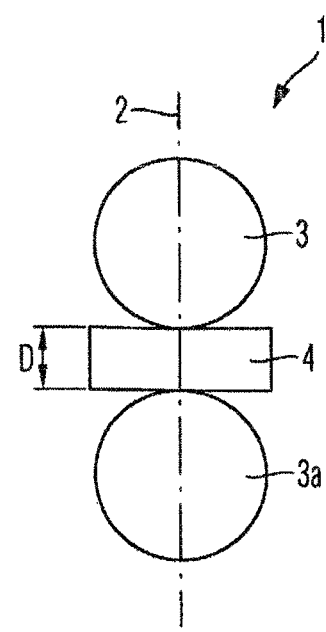
FIG. 2 is a view of a second embodiment of a connection element according to the invention.

FIG. 2 illustrates an embodiment of a connection element 1 which, in addition to the first clamping head 3, has a second clamping head 3a. In the embodiment illustrated here, the two clamping heads 3, 3a are each constructed as a sphere. The two clamping heads 3, 3a are arranged on two mutually opposite sides of the fitting section 4 and are connected with the fitting section 4. The two connection elements 1 illustrated in FIGS. 1 and 2 can be produced in one piece of a metallic material or of a synthetic material. They may, for example, have been cast, turned by way of a turning machine or milled.

Figure 3:
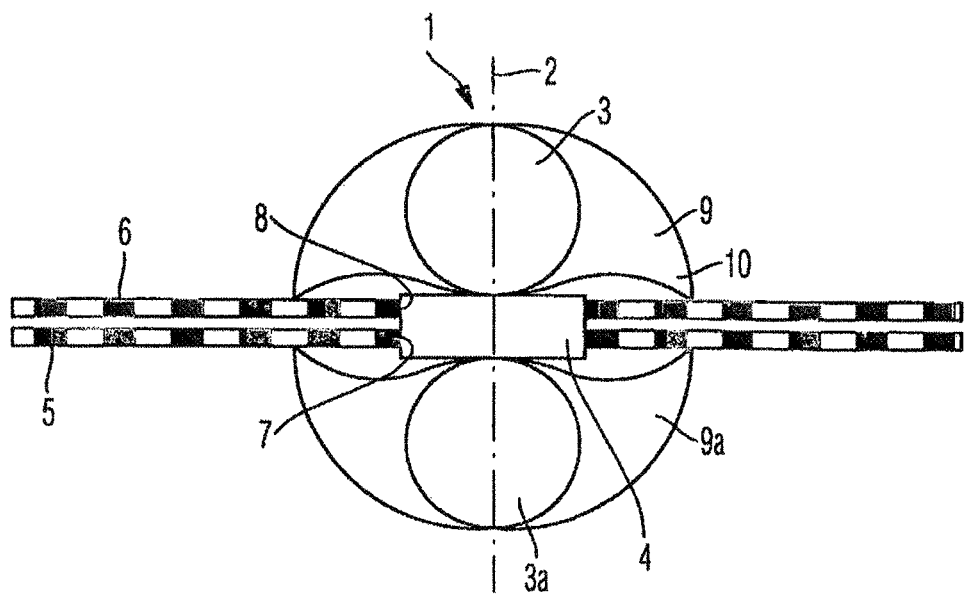
FIG. 3 is a view of two components which are mutually connected by way of the connection element illustrated in FIG. 2 and two clamping elements.

FIG. 3 illustrates the basic principle as to how two components can be positioned relative to one another and be connected with one another by way of a connection element, as illustrated in FIG. 1 or 2 In the case of the embodiment illustrated in FIG. 3, a connection element 1 is used, as shown in FIG. 2. FIG. 3 illustrates a first blank-type component 5, which may, for example, be a metal plate of a vehicle body component (not shown here in detail), onto which a second blank-type component 6 is placed which may, for example, also be a metal plate of a vehicle body component. A hole 7 is provided in the first component 5. A second hole 8 is provided in the second component 6. The two components 5, 6 are oriented relative to one another such that they rest against one another, and the two holes 7, 8 are oriented concentrically to one another. The connection element 1 illustrated in FIG. 2 is fitted through the two holes 7, 8.

As illustrated in FIG. 3, the fitting section 4 is designed to be complementary with respect to the two holes. As a result of the fitting section 4, the two components 5, 6 are therefore positioned to be undisplaceable in directions which are transverse with respect to the longitudinal axis 2. In the case of the embodiment illustrated in FIG. 3, the thickness D of the fitting section 4 measured in the direction of the longitudinal axis (see FIG. 2) is slightly greater than the sum of the thicknesses of the two components 5, 6. The fitting section 4 therefore projects slightly beyond the two blank-type components 5, 6. This must not necessarily be so. The thickness D of the fitting section could also be slightly less than the sum of the component thicknesses in the area of the holes 7, 8.

As illustrated in FIG. 3, a first clamping element 9 is clamped or clipped onto the first clamping head 3, and a second clamping element 9a is clamped or clipped onto the second clamping head 3a. The clamping element 9 is designed here to be rotationally symmetrical with respect to the longitudinal axis 2. It has a surrounding ring-type supporting area 10 which presses on an exterior side of the component 6, which faces away from the component 5. The design of the clamping element 9a is identical to that of clamping element 9.

The two clamping elements 9, 9a and the connection element 1 are mutually configured such that, after the clipping of the two clamping elements 9, 9a onto the clamping heads 3, 3a of the connection element 1, a clamping force is generated that clamps the two components together.

For this purpose, the two clamping elements 9, 9a have to have a sufficiently elastic construction so that a clipping onto the assigned clamping head 3 and 3a, respectively, becomes possible.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A component connection comprising:
    a first component having a first hole;
    a second component having a second hole;
    a connecting element that extends through the first and second holes, and which projects over the first and second components;
    a clamping element that is supported on a side of the first component that is remote from the second component and exerts on the connecting element a clamping force which clamps the first and second components together; and
    a fitting portion having a thickness that is slightly greater than or slightly less than the combined thickness of the first and second components, wherein
    the connecting element has at least one clamping head having a shape of a sphere and which projects over a side of the first component which is distant from the second component,
    the clamping element is elastically clipped onto the sphere,
    the first component and second component directly contact each other at the perimeters of the first hole and second hole, and
    the first component and the second component are separate and distinct components which are movable relative to one another.

2. The component connection according to claim 1, wherein the first and second holes are circular.

3. The component connection according to claim 1 wherein the first and second holes are oriented concentrically relative to one another.

4. The component connection according to claim 1, wherein the connecting element is rotationally symmetrical with respect to the longitudinal axis of the connecting element.

5. The component connection according to claim 1, wherein the clamping head is formed in one piece with the fitting portion.

6. The component connection according to claim 1, wherein the at least one clamping head includes a first clamping head which is connected to a second clamping head via the fitting portion.

7. The component connection according to claim 6, wherein a second clamping element is clipped onto the second clamping head.

8. The component connection according to claim 1, wherein the connecting element is made of steel or aluminum.

9. The component connection according to claim 1, wherein at least one of the first and second components is a part of a vehicle body.

10. The component connection according to claim 1, wherein the first surface of the fitting portion directly contacts a convex outer surface of the sphere, and a second surface of the fitting portion, that is orthogonal to the first surface, directly contacts edges of the first and second components that define the first and second holes.

11. The component connection according to claim 1, wherein the first and second components are permanently connected together by welding or gluing.

12. The component connection according to claim 1, wherein the first and second components are positioned by the fitting portion non-displaceably relative to each other along a longitudinal axis of the connecting element.

* * * * *